(12) United States Patent
Rozas et al.

(10) Patent No.: US 7,606,979 B1
(45) Date of Patent: *Oct. 20, 2009

(54) METHOD AND SYSTEM FOR CONSERVATIVELY MANAGING STORE CAPACITY AVAILABLE TO A PROCESSOR ISSUING STORES

(76) Inventors: Guillermo Rozas, 104 Magneson Ter., Los Gatos, CA (US) 95032; Alexander Klaiber, 231 Sierra Vista Ave., Mountain View, CA (US) 94043; David Dunn, 4525 191st Pl., NE., Sammamish, WA (US) 98074; Paul Serris, 661 San Diego Ave., Sunnyvale, CA (US) 94085; Lacky Shah, 1228 Sunrise Dr., Fremont, CA (US) 94539

( * ) Notice: Subject to any disclaimer, the term of this patent is extended or adjusted under 35 U.S.C. 154(b) by 0 days.

This patent is subject to a terminal disclaimer.

(21) Appl. No.: 11/638,236

(22) Filed: Dec. 12, 2006

Related U.S. Application Data

(63) Continuation of application No. 10/646,461, filed on Aug. 21, 2003, now Pat. No. 7,149,851.

(51) Int. Cl.
*G06F 13/16* (2006.01)
(52) U.S. Cl. ......................................... 711/141; 710/57
(58) Field of Classification Search ................. 711/118, 711/141, 144; 710/57
See application file for complete search history.

(56) References Cited

U.S. PATENT DOCUMENTS

| 5,155,831 | A | * | 10/1992 | Emma et al. | 711/121 |
|---|---|---|---|---|---|
| 5,471,583 | A | * | 11/1995 | Au et al. | 710/57 |
| 5,548,735 | A | * | 8/1996 | Chen et al. | 710/7 |
| 5,634,073 | A | * | 5/1997 | Collins et al. | 710/5 |
| 5,802,574 | A | * | 9/1998 | Atallah et al. | 711/144 |
| 5,838,943 | A | * | 11/1998 | Ramagopal et al. | 712/218 |
| 5,926,645 | A | * | 7/1999 | Williamson | 712/23 |
| 5,930,821 | A | * | 7/1999 | Gaskins et al. | 711/146 |
| 6,006,317 | A | * | 12/1999 | Ramagopal et al. | 712/23 |
| 6,119,205 | A | * | 9/2000 | Wicki et al. | 711/143 |
| 6,134,651 | A | * | 10/2000 | Witt et al. | 712/215 |
| 6,385,676 | B1 | * | 5/2002 | Adkisson | 710/100 |
| 6,438,634 | B1 | * | 8/2002 | Watanabe et al. | 710/110 |
| 6,460,130 | B1 | * | 10/2002 | Trull et al. | 712/32 |
| 6,487,615 | B1 | * | 11/2002 | Hunsaker | 710/52 |
| 6,487,639 | B1 | | 11/2002 | Lipasti | |
| 6,526,480 | B1 | * | 2/2003 | Naruse et al. | 711/144 |
| 6,564,301 | B1 | * | 5/2003 | Middleton | 711/144 |

(Continued)

OTHER PUBLICATIONS

Handy, The Cache Memory Book, 1998, pp. 66 and 77-86.

(Continued)

*Primary Examiner*—Kevin L Ellis (57) ABSTRACT

Method and system for conservatively managing store capacity available to a processor issuing stores are provided and described. In particular, a counter mechanism is utilized, whereas the counter mechanism is incremented or decremented based on the occurrence of particular events.

42 Claims, 6 Drawing Sheets

U.S. PATENT DOCUMENTS

| | | |
|---|---|---|
| 6,571,316 B1 | 5/2003 | D'Souza et al. |
| 6,668,287 B1 | 12/2003 | Boyle et al. |
| 6,725,337 B1 * | 4/2004 | Tan et al. ................... 711/133 |
| 6,725,361 B1 | 4/2004 | Rozas et al. |
| 6,728,865 B1 | 4/2004 | Coon et al. |
| 6,775,749 B1 * | 8/2004 | Mudgett et al. ............. 711/146 |
| 6,877,088 B2 * | 4/2005 | Dice ......................... 712/235 |
| 6,976,110 B2 * | 12/2005 | Moyer et al. ................ 710/260 |
| 7,149,851 B1 | 12/2006 | Rozas et al. |
| 7,149,872 B2 | 12/2006 | Rozas et al. |
| 7,225,299 B1 | 5/2007 | Rozas et al. |
| 2003/0014602 A1 | 1/2003 | Shibayama et al. |

OTHER PUBLICATIONS

Notice of Allowance Dated Feb. 21, 2006; U.S. Appl. No. 10/646,461.

Notice of Allowance Dated Jul. 24, 2006; U.S. Appl. No. 10/646,461.

\* cited by examiner

METHOD AND SYSTEM FOR CONSERVATIVELY MANAGING STORE CAPACITY AVAILABLE TO A PROCESSOR ISSUING STORES

RELATED UNITED STATES PATENT APPLICATIONS

This Continuation application claims the benefit of the commonly-owned U.S. patent application Ser. No. 10/646,461, filed on Aug. 21, 2003, now U.S. Pat. No. 7,149,851 by Rozas et al., and entitled "METHOD AND SYSTEM FOR CONSERVATIVELY MANAGING STORE CAPACITY AVAILABLE TO A PROCESSOR ISSUING STORES," which is incorporated herein by reference.

BACKGROUND OF THE INVENTION

1. Field of the Invention

The present invention generally relates to processors. More particularly, the present invention relates to the field of conservatively managing store capacity available to a processor issuing stores.

2. Related Art

When a processor is operating, the processor issues stores, whereas each store includes data and an address in which to store the data externally relative to the processor. The management of the store capacity for handling the issued stores affects the performance of the processor.

SUMMARY OF THE INVENTION

Method and system for conservatively managing store capacity available to a processor issuing stores are provided and described. In particular, a counter mechanism is utilized, whereas the counter mechanism is incremented or decremented based on the occurrence of particular events.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details.

Figure 1:
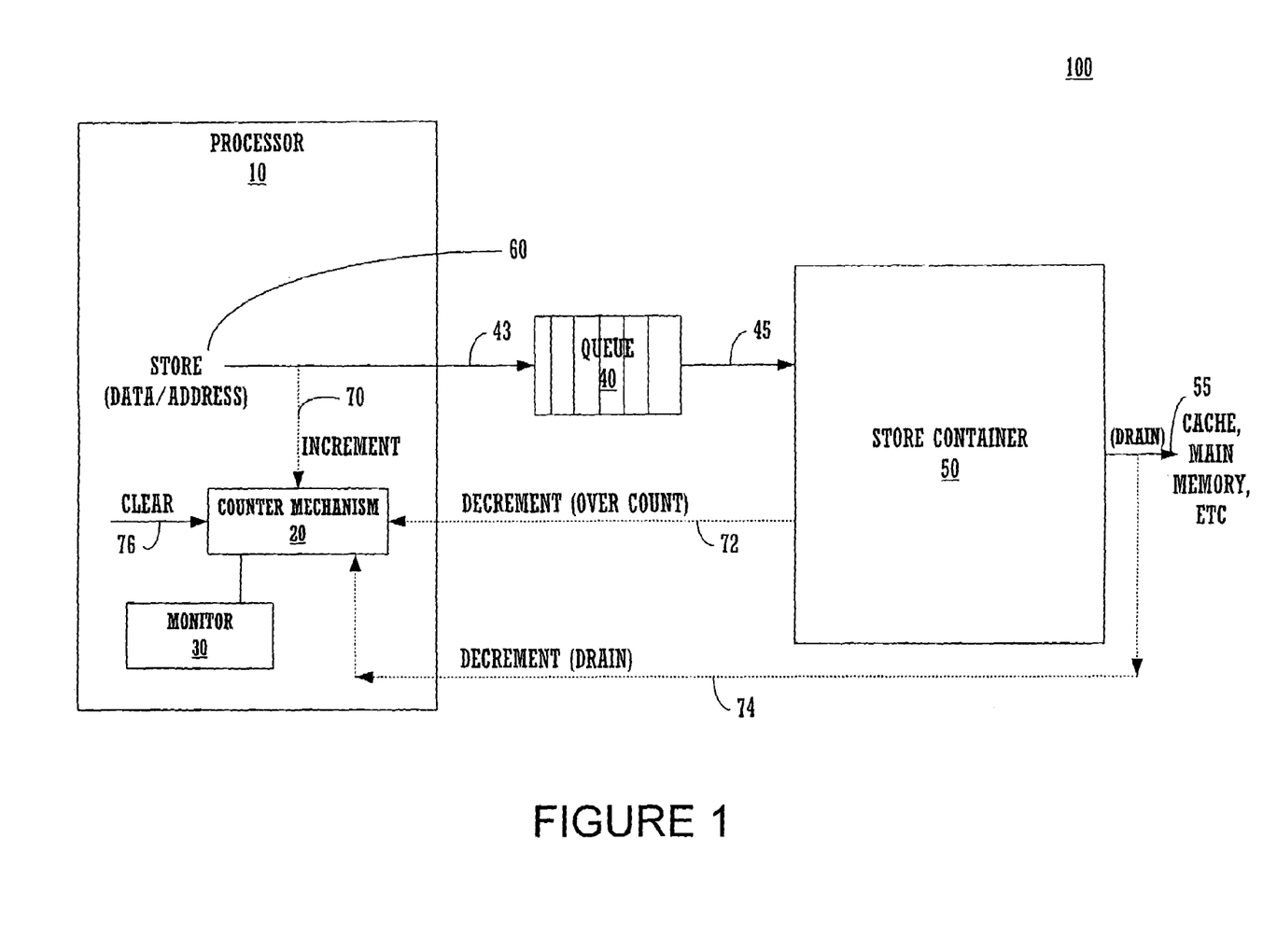
FIG. 1 illustrates a system in accordance with a first embodiment of the present invention, showing a counter mechanism.

FIG. 1 illustrates a system 100 in accordance with a first embodiment of the present invention, showing a counter mechanism 20. As depicted in FIG. 1, the system 100 includes a processor 10, one or more queues 40, and a store container 50. When the processor 10 issues a store 60 (including data and address), the store 60 proceeds via line 43 through one or more queues 40. A queue 40 may be internal or external relative to the processor 10. The store 60 is received by the store container 50 from the queue 40 via the line 45. From the store container 50, the stores 60 drain via line 55 to a cache, main memory, etc. The store container 50 has a fixed store capacity.

Typically, the draining of stores 60 from the store container 50 is done asynchronously relative to the issuance of stores 60 by the processor 10. Moreover, since the stores 60 proceed through the one or more queues 40 before arriving at the store container 50, there is a latency between the processor 10 issuing the next store 60 and a determination that the store container 50 has reached its store capacity when it received a prior issued store 60. Ideally, the processor 10 needs to know that the store container 50 is at its store capacity before the processor 10 issues the next store 60. Otherwise, an overflow condition can occur, leading to erroneous operation of the processor 10.

As shown in FIG. 1, the processor 10 includes a monitor 30 and a counter mechanism 20 that receives several input signals 70-76. Rather than assuming that the store container 50 has sufficient store capacity to avoid the overflow condition, the counter mechanism 20 is utilized, whereas the counter mechanism 20 is incremented or decremented based on the occurrence of particular events, which will be described below in conjunction with FIG. 2.

The counter mechanism 20 allows the store capacity of the store container 50 to be conservatively managed. That is, the value (or count) of the counter mechanism 20 resulting from the plurality of increments and decrements dependent on particular events generally reflects an underestimation of the amount of store capacity being utilized at a particular time. Thus, when the value (or count) of the counter mechanism 20 equals a predetermined value, a response is executed that stops the normal operation of the processor 10. This response causes the draining of the queues 40, leading to further adjustments to the value of the counter mechanism 20. As a result of these adjustments to the value of the counter mechanism 20, an actual value that reflects the amount of store capacity being currently utilized is determined. That is, the actual value (or number) of issued stores in the store container 50 is determined. This determination controls further action taken. If the actual value indicates no overflow condition (e.g., store capacity has not been exceeded), the processor 10 can proceed to normal operation. However, if the actual value indicates an overflow condition (e.g., store capacity has been exceeded), the processor 10 responds with the appropriate error message or takes any other action in response to the overflow condition.

Separately, the monitor 30 indicates when the value of the counter mechanism 20 equals the predetermined value and initiates the response to this occurrence. Selection of the predetermined value determines the degree of conservatism in managing the store capacity of the store container 50. The closer the predetermined value is to the store capacity the lesser the degree of conservatism. However, if the predetermined value is selected with a high degree of conservatism, the performance of the processor 10 can be negatively affected.

Figure 2:
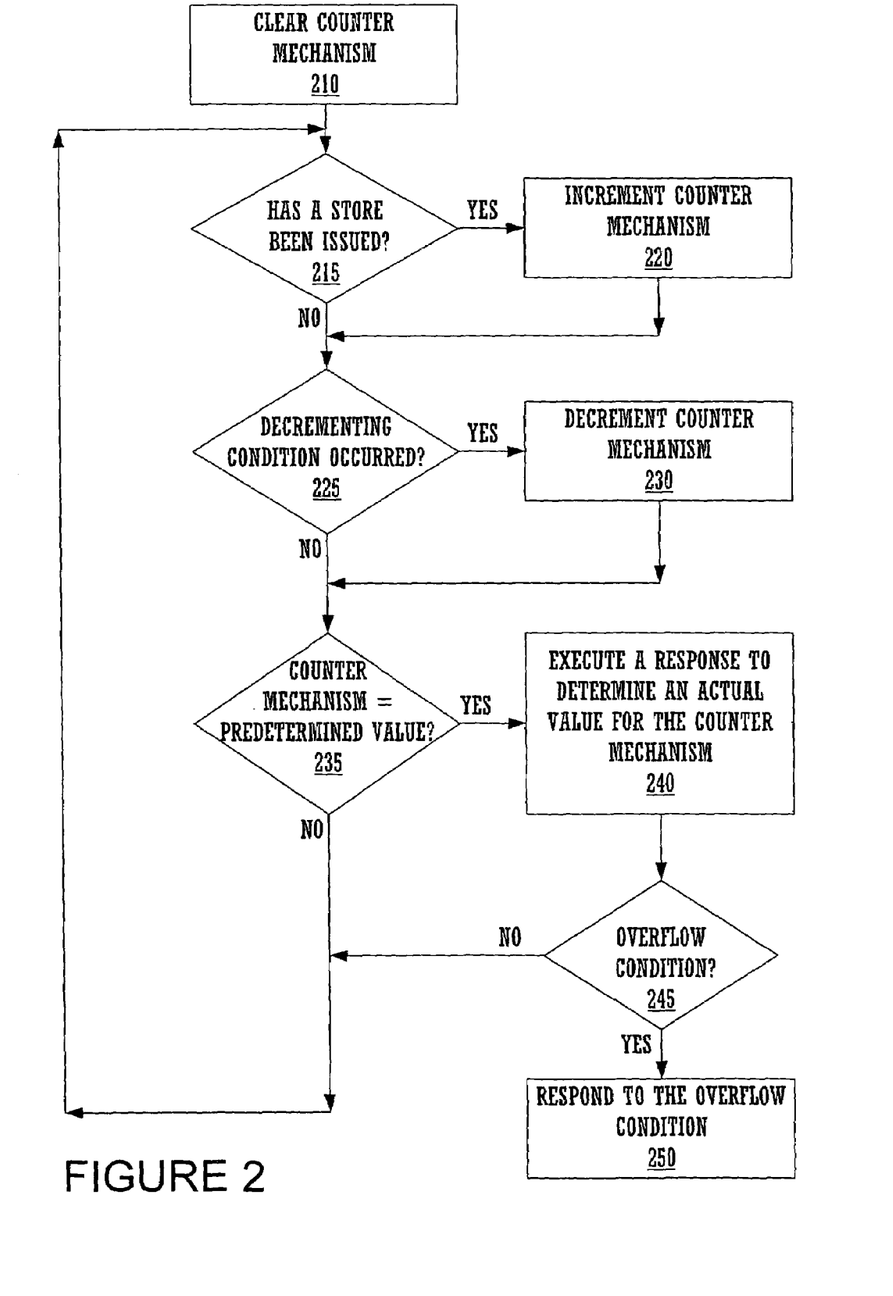
FIG. 2 illustrates a flow chart showing operation of the counter mechanism of FIG. 1 in accordance with a first embodiment of the present invention.

FIG. 2 illustrates a flow chart 200 showing operation of the counter mechanism 20 of FIG. 1 in accordance with a first embodiment of the present invention. Reference is made to FIG. 1.

At Step 210, the counter mechanism 20 is cleared via line 76. Continuing, at Step 215, it is determined whether the processor 10 has issued a store 60. As described above, the store 60 proceeds to a queue 40. The issuance of a store 60 is one of the particular events of interest. If the processor 10 has issued a store 60, at Step 220 the counter mechanism 20 is incremented via line 70. Otherwise, operation continues to Step 225.

Further, at Step 225, it is determined whether a decrementing condition has occurred, whereas decrementing conditions are also particular events of interest. There are several types of decrementing conditions, whereas a decrementing condition causes the counter mechanism 20 to be decremented. A first type (or drain type) of decrementing condition is the draining of an issued store 60 from the store container 50 via line 55 to a cache, main memory, etc. This action reduces the number of issued stores 60 in the store container 50. A second type (or over count type) of decrementing condition occurs when the store container 50 receives an issued store 60 that occupies a pre-allocated space (e.g., because the stores have the same address) avoiding the need to allocate new space for the issued store 60 in the store container 50.

If the first type of decrementing condition occurs, at Step 230 the counter mechanism 20 is decremented via line 74. If the second type of decrementing condition occurs, at Step 230 the counter mechanism 20 is decremented via line 72. Otherwise, operation continues to Step 235.

At Step 235, it is determined whether the value of the counter mechanism 20 equals the predetermined value. If the value of the counter mechanism 20 does not equal the predetermined value, operation continues to Step 215. If the value of the counter mechanism 20 does equal the predetermined value, operation continues to Step 240.

Moreover, at Step 240, the monitor 30 initiates a response to determine an actual value for the counter mechanism 20 that reflects the amount of store capacity being currently utilized. The response may involve taking an exception, running a special state machine, or any other action by the processor 10. However, the response does include draining the queues 40. This activity leads to further adjustments to the value of the counter mechanism 20. As a result of these adjustments to the value of the counter mechanism 20, determination is made of the actual value for the counter mechanism 20 that reflects the amount of store capacity being currently utilized (e.g., the issued stores 60 in the store container 50).

Furthermore, at Step 245, it is determined whether an overflow condition (e.g., store capacity has been exceeded) has occurred. If the overflow condition has not occurred, operation continues to Step 215, whereas the processor 10 returns to normal operation. If the overflow condition has occurred, operation continues to Step 250. At Step 250, the processor 10 responds with the appropriate error message or takes any other action in response to the overflow condition.

Figure 3:
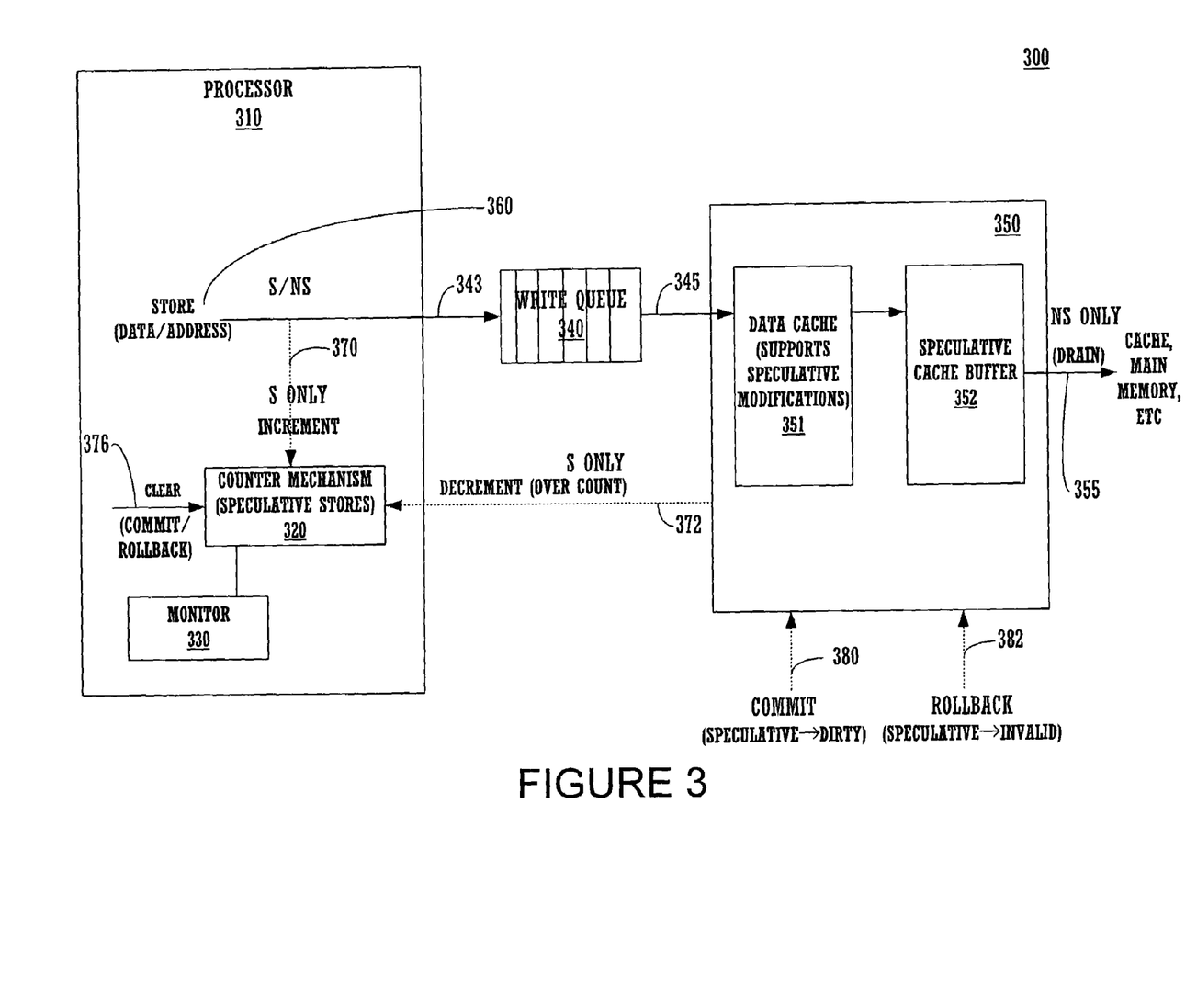
FIG. 3 illustrates a system in accordance with a second embodiment of the present invention, showing a counter mechanism.

FIG. 3 illustrates a system 300 in accordance with a second embodiment of the present invention, showing a counter mechanism 320. As shown in FIG. 3, the system 300 includes a processor 310. The processor 310 is able to speculatively execute instructions. If the processor 310 speculatively executes instructions to a particular instruction boundary without generating errors, the speculative (S) stores issued by the processor 310 can be made permanent with a commit operation. However, if errors occur before reaching the particular instruction boundary, the speculative stores issued by the processor 310 have to be undone with a rollback operation. Moreover, the processor 310 is able to issue non-speculative (NS) stores.

The system 300 further comprises a write queue 340 and a store container 350. The system 300 can have other queues in addition to the write queue 340. The store container 350 comprises a data cache 351 that supports speculative modifications (e.g., speculative stores) and a speculative cache buffer 352. Further description of the data cache 351 that supports speculative modifications (e.g., speculative stores) and the speculative cache buffer 352 can be found in the patent application entitled "SUPPORTING SPECULATIVE MODIFICATION IN A DATA CACHE", by Rozas et al., which is assigned to the assignee of the present patent application, and which is incorporated herein by reference.

Although non-speculative (NS) stores can be drained from the data cache 351 and the speculative cache buffer 352, speculative (S) stores cannot be drained from the data cache 351 and the speculative cache buffer 352. Hence, the store container 350 has a fixed store capacity for issued speculative (S) stores.

When the processor 310 issues a [speculative (S) or non-speculative (NS)] store 360 (including data and address), the store 360 proceeds via line 343 through the write queue 340. The store 360 is received by the store container 350 from the write queue 340 via the line 345. From the store container 350, the non-speculative (NS) stores 360 drain via line 355 to a cache, main memory, etc.

Generally, the draining of non-speculative (NS) stores 360 from the store container 350 is done asynchronously relative to the issuance of stores 360 by the processor 310. Moreover, since the stores 360 proceed through the write queue 340 before arriving at the store container 350, there is a latency between the processor 310 issuing the next speculative (S) store 360 and a determination that the store container 350 has reached its store capacity for speculative (S) stores when it received a prior issued speculative (S) store 360. Ideally, the processor 310 needs to know that the store container 350 is at its store capacity for speculative (S) stores before the processor 310 issues the next speculative (S) store 360. Otherwise, an overflow condition can occur, leading to erroneous operation of the processor 310.

As shown in FIG. 3, the processor 310 includes a monitor 330 and a counter mechanism 320 that receives several input signals 370-376. Rather than assuming that the store container 350 has sufficient store capacity for speculative (S) stores to avoid the overflow condition even though speculative (S) stores cannot be drained, the counter mechanism 320 is utilized, whereas the counter mechanism 320 is incremented or decremented based on the occurrence of particular events related to speculative (S) stores, which will be described below in conjunction with FIG. 4.

The counter mechanism 320 allows the store capacity for speculative (S) stores of the store container 350 to be conservatively managed by focusing on speculative (S) stores. That is, the value (or count) of the counter mechanism 320 resulting from the plurality of increments and decrements dependent on particular events related to speculative (S) stores generally reflects an underestimation of the amount of the store capacity for speculative (S) stores being utilized at a particular time. Thus, when the value (or count) of the counter mechanism 320 equals a predetermined value, a response is executed that stops the normal operation of the processor 310. This response causes the draining of the write queue 340, leading to further adjustments to the value of the counter mechanism 320. As a result of these adjustments to the value of the counter mechanism 320, an actual value that reflects the amount of store capacity for speculative (S) stores being currently utilized is determined. That is, the actual value (or number) of issued speculative (S) stores in the store container 350. This determination controls further action taken. If the actual value indicates no overflow condition (e.g., store capacity for speculative (S) stores has not been exceeded), the processor 310 can proceed to normal operation. However, if the actual value indicates an overflow condition (e.g., store capacity for speculative (S) stores has been exceeded), the processor 310 responds with the appropriate error message or takes any other action in response to the overflow condition.

Moreover, the monitor 330 indicates when the value of the counter mechanism 320 equals the predetermined value and initiates the response to this occurrence. Selection of the predetermined value determines the degree of conservatism in managing the store capacity for speculative (S) stores of the store container 350. The closer the predetermined value is to the store capacity for speculative (S) stores the lesser the degree of conservatism. However, if the predetermined value is selected with a high degree of conservatism, the performance of the processor 310 can be negatively affected.

Figure 4:
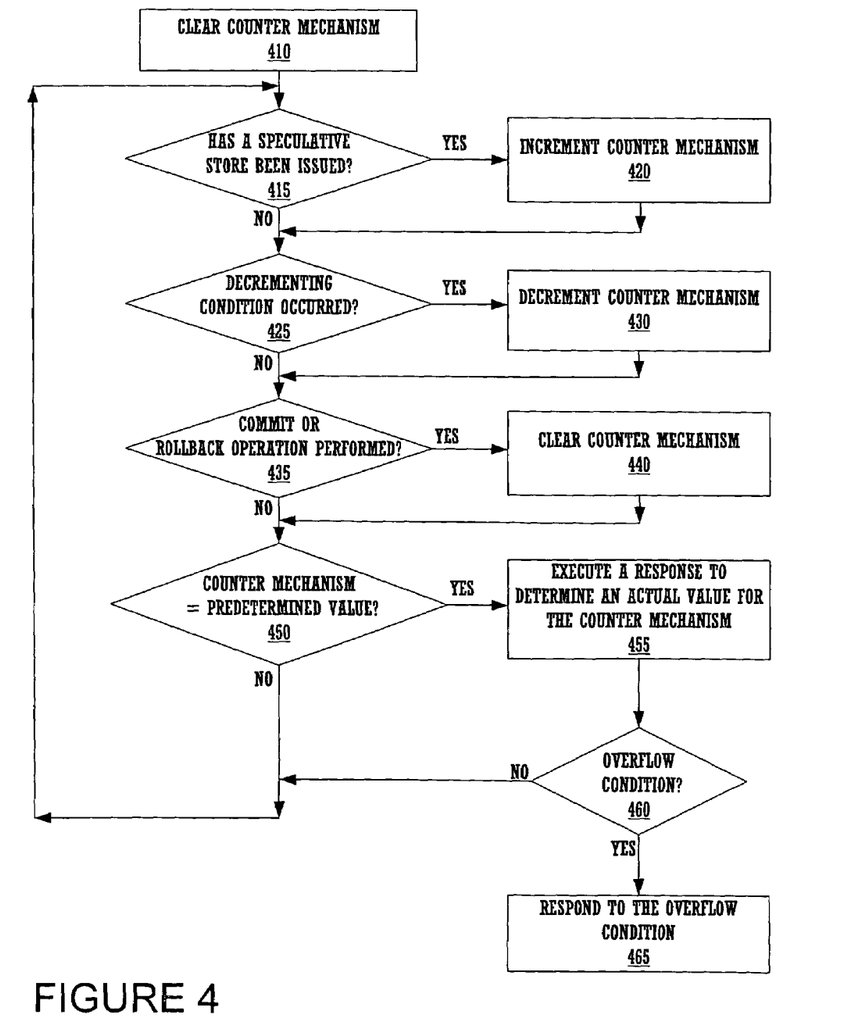
FIG. 4 illustrates a flow chart showing operation of the counter mechanism of FIG. 3 in accordance with a second embodiment of the present invention.

FIG. 4 illustrates a flow chart 400 showing operation of the counter mechanism 320 of FIG. 3 in accordance with a second embodiment of the present invention. Reference is made to FIG. 3.

At Step 410, the counter mechanism 320 is cleared via line 376. Continuing, at Step 415, it is determined whether the processor 310 has issued a speculative (S) store 360. As described above, the store 360 proceeds to a write queue 340. The issuance of a speculative (S) store 360 is one of the particular events of interest. If the processor 310 has issued a speculative (S) store 360, at Step 420 the counter mechanism 320 is incremented via line 370. Otherwise, operation continues to Step 425.

Further, at Step 425, it is determined whether a decrementing condition has occurred, whereas decrementing conditions are also particular events of interest. A decrementing condition causes the counter mechanism 320 to be decremented. Here, the decrementing condition occurs when the store container 350 receives an issued speculative (S) store 360 that occupies a pre-allocated space (e.g., because the speculative (S) stores have the same address) avoiding the need to allocate new space (e.g., cache line) for the issued speculative (S) store 360 in the store container 350.

If the decrementing condition occurs, at Step 430 the counter mechanism 320 is decremented via line 372. Otherwise, operation continues to Step 435.

At Step 435, it is determined whether a commit or rollback operation has been performed to the store container 350. The commit operation performed via line 380 turns a speculative (S) store into a non-speculative (NS) store. In particular, cache lines having a speculative state are changed to a dirty state in the data cache 351 and the speculative cache buffer 352. The rollback operation performed via line 382 invalidates a speculative (S) store. In particular, cache lines having a speculative state are changed to an invalid state in the data cache 351 and the speculative cache buffer 352.

If a commit or rollback operation has been performed to the store container 350, at Step 440 the counter mechanism 320 is cleared via line 376. Otherwise, operation continues to Step 450.

At Step 450, it is determined whether the value of the counter mechanism 320 equals the predetermined value. If the value of the counter mechanism 320 does not equal the predetermined value, operation continues to Step 415. If the value of the counter mechanism 320 does equal the predetermined value, operation continues to Step 455.

Moreover, at Step 455, the monitor 330 initiates a response to determine an actual value for the counter mechanism 320 that reflects the amount of store capacity for speculative (S) stores being currently utilized. The response may involve taking an exception, running a special state machine, or any other action by the processor 310. However, the response does include draining the write queue 340. This activity leads to further adjustments to the value of the counter mechanism 320. As a result of these adjustments to the value of the counter mechanism 320, determination is made of the actual value for the counter mechanism 320 that reflects the amount of store capacity for speculative (S) stores being currently utilized.

Furthermore, at Step 460, it is determined whether an overflow condition (e.g., store capacity for speculative (S) stores has been exceeded) has occurred. If the overflow condition has not occurred, operation continues to Step 415, whereas the processor 310 returns to normal operation. If the overflow condition has occurred, operation continues to Step 465. At Step 465, the processor 310 responds with the appropriate error message or takes any other action in response to the overflow condition.

Figure 5:
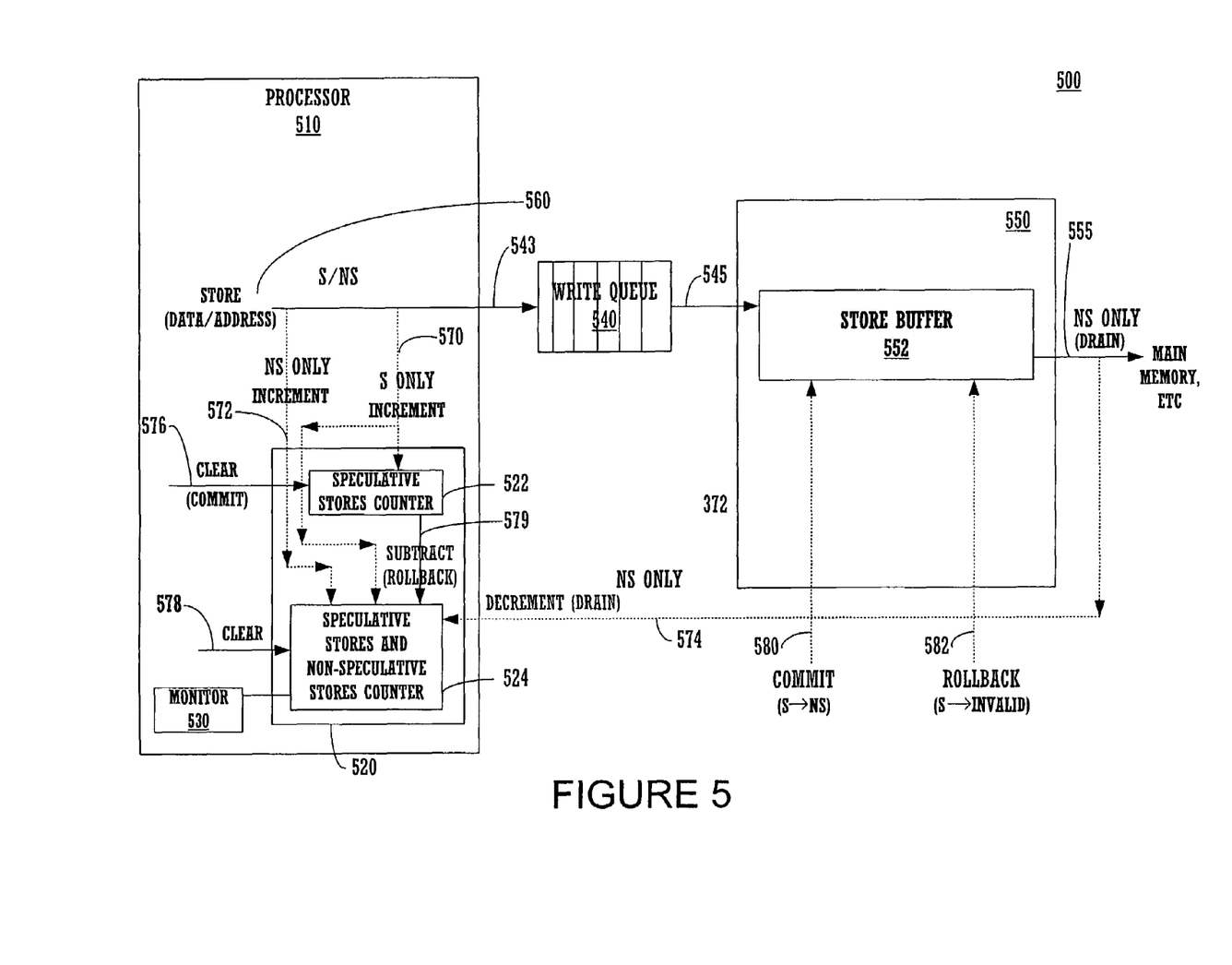
FIG. 5 illustrates a system in accordance with a third embodiment of the present invention, showing a counter mechanism.

FIG. 5 illustrates a system 500 in accordance with a third embodiment of the present invention, showing a counter mechanism 520. As shown in FIG. 5, the system 500 includes a processor 510. The processor 510 is able to speculatively execute instructions. If the processor 510 speculatively executes instructions to a particular instruction boundary without generating errors, the speculative (S) stores issued by the processor 510 can be made permanent with a commit operation. However, if errors occur before reaching the particular instruction boundary, the speculative stores issued by the processor 510 have to be undone with a rollback operation. Moreover, the processor 510 is able to issue non-speculative (NS) stores.

The system 500 further comprises a write queue 540 and a store container 550. The system 500 can have other queues in addition to the write queue 540. The store container 550 comprises a store buffer 552, which has access to main memory, etc. In one embodiment, the store buffer 552 has a FIFO configuration.

Although non-speculative (NS) stores can be drained from the store buffer 552, speculative (S) stores cannot be drained from the store buffer 552. The FIFO configuration can lead to a situation where a speculative (S) store blocks draining of non-speculative (NS) stores. Hence, the store buffer 552 has a store capacity that is a function of issued speculative (S) stores and issued non-speculative (NS) stores.

When the processor 510 issues a [speculative (S) or non-speculative (NS)] store 560 (including data and address), the store 560 proceeds via line 543 through the write queue 540. The store 560 is received by the store buffer 552 from the write queue 540 via the line 545. From the store buffer 552, the non-speculative (NS) stores 560 drain via line 555 to main memory, etc.

Since the stores 560 proceed through the write queue 540 before arriving at the store buffer 552, there is a latency between the processor 510 issuing the next [speculative (S) or non-speculative (NS)] store 560 and a determination that the store buffer 552 has reached its store capacity for speculative (S) stores and non-speculative (NS) stores when it received a prior issued [speculative (S) or non-speculative (NS)] store 560. Ideally, the processor 510 needs to know that the store buffer 552 is at its store capacity for speculative (S) stores and non-speculative (NS) stores before the processor 510 issues the next [speculative (S) or non-speculative (NS)] store 560. Otherwise, an overflow condition can occur, leading to erroneous operation of the processor 510.

As shown in FIG. 5, the processor 510 includes a monitor 530 and a counter mechanism 520. The counter mechanism 520 includes a speculative stores counter (or SS counter) 522 and a speculative stores and non-speculative stores counter (or SSNSS counter) 524. The SS counter 522 receives several input signals 570 and 576 and outputs signal 579. Similarly, the SSNSS counter 524 receives several input signals 570, 572, 574, 578, and 579. Rather than assuming that the store buffer 552 has sufficient store capacity for speculative (S) stores and non-speculative (NS) stores to avoid the overflow condition even though speculative (S) stores cannot be drained, the SS counter 522 and the SSNSS counter 524 are utilized, whereas the SS counter 522 and the SSNSS counter 524 are incremented or decremented based on the occurrence of particular events related to speculative (S) stores and non-speculative (NS) stores, which will be described below in conjunction with FIG. 6.

The SS counter 522 and the SSNSS counter 524 allow the store capacity for speculative (S) stores and non-speculative (NS) stores of the store buffer 552 to be conservatively managed by focusing on both speculative (S) stores and non-speculative (NS) stores. That is, the value (or count) of the SS counter 522 and the value (or count) of the SSNSS counter 524 resulting from the plurality of increments and decrements dependent on particular events related to speculative (S) stores and non-speculative (NS) stores conservatively reflect the store capacity for speculative (S) stores and non-speculative (NS) stores being utilized at a particular time. In particular, when the value (or count) of the SSNSS counter 524 equals a predetermined value, a response is executed that stops the normal operation of the processor 510. This response causes the draining of the write queue 540, leading to further adjustments to the value of the SSNSS counter 524. As a result of these adjustments to the value of the SSNSS counter 524, an actual value that reflects the store capacity for speculative (S) stores and non-speculative (NS) stores being currently utilized is determined. That is, the actual value (or number) of issued stores in the store buffer 552 is determined. This determination controls further action taken. If the actual value indicates no overflow condition (e.g., store capacity for speculative (S) stores and non-speculative (NS) stores has not been exceeded), the processor 510 can proceed to normal operation. However, if the actual value indicates an overflow condition (e.g., store capacity for speculative (S) stores and non-speculative (NS) stores has been exceeded), the processor 510 responds with the appropriate error message or takes any other action in response to the overflow condition.

Additionally, the monitor 530 indicates when the value of the SSNSS counter 524 equals the predetermined value and initiates the response to this occurrence. Selection of the predetermined value determines the degree of conservatism in managing the store capacity for speculative (S) stores and non-speculative (NS) stores of the store buffer 552. The closer the predetermined value is to the store capacity for speculative (S) stores and non-speculative (NS) stores the lesser the degree of conservatism. However, if the predetermined value is selected with a high degree of conservatism, the performance of the processor 510 can be negatively affected.

Figure 6:
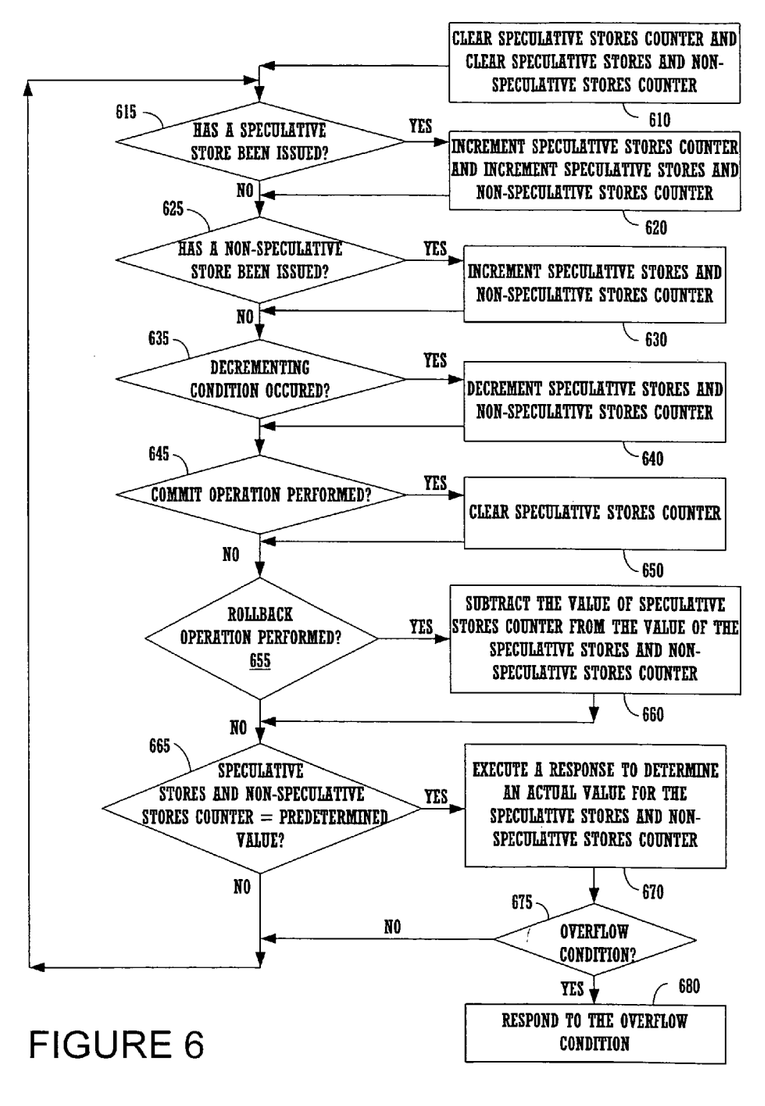
FIG. 6 illustrates a flow chart showing operation of the counter mechanism of FIG. 5 in accordance with a third embodiment of the present invention.

FIG. 6 illustrates a flow chart 600 showing operation of the counter mechanism 520 of FIG. 5 in accordance with a third embodiment of the present invention. Reference is made to FIG. 5.

At Step 610, the SS counter 522 is cleared via line 576. Moreover, the SSNSS counter 524 is cleared via line 578. Continuing, at Step 615, it is determined whether the processor 510 has issued a speculative (S) store 560. As described above, the store 560 proceeds to a write queue 540. The issuance of a speculative (S) store 560 is one of the particular events of interest. If the processor 510 has issued a speculative (S) store 560, at Step 620 the SS counter 522 and the SSNSS counter 524 are incremented via line 570. Otherwise, operation continues to Step 625.

At Step 625, it is determined whether the processor 510 has issued a non-speculative (NS) store 560. As described above, the store 560 proceeds to a write queue 540. The issuance of a non-speculative (NS) store 560 is one of the particular events of interest. If the processor 510 has issued a non-speculative (NS) store 560, at Step 630 the SSNSS counter 524 is incremented via line 572. Otherwise, operation continues to Step 635.

Further, at Step 635, it is determined whether a decrementing condition has occurred, whereas decrementing conditions are also particular events of interest. A decrementing condition causes the SSNSS counter 524 to be decremented. Here, the decrementing condition occurs when an issued non-speculative (NS) store is drained from the store buffer 552 via line 555 to main memory, etc. This action reduces the number of issued non-speculative (NS) stores in the store buffer 552.

If the decrementing condition occurs, at Step 640 the SSNSS counter 524 is decremented via line 574. Otherwise, operation continues to Step 645.

At Step 645, it is determined whether a commit operation has been performed to the store buffer 552. The commit operation performed via line 580 turns a speculative (S) store into a non-speculative (NS) store.

If a commit operation has been performed to the store buffer 552, at Step 650 the SS counter 522 is cleared via line 576. Otherwise, operation continues to Step 655.

At Step 655, it is determined whether a rollback operation has been performed to the store buffer 552. The rollback operation performed via line 582 invalidates a speculative (S) store.

If a rollback operation has been performed to the store buffer 552, at Step 660 the value of the SS counter 522 is subtracted from the value of the SSNSS counter 524 via line 579. Otherwise, operation continues to Step 665.

At Step 665, it is determined whether the value of the SSNSS counter 524 equals the predetermined value. If the value of the SSNSS counter 524 does not equal the predetermined value, operation continues to Step 615. If the value of the SSNSS counter 524 does equal the predetermined value, operation continues to Step 670.

Moreover, at Step 670, the monitor 530 initiates a response to determine an actual value for the SSNSS counter 524 that reflects the store capacity for speculative (S) stores and non-speculative (NS) stores being currently utilized. The response may involve taking an exception, running a special state machine, or any other action by the processor 510. However, the response does include draining the write queue 540. This activity leads to further adjustments to the value of the SSNSS counter 524. As a result of these adjustments to the value of the SSNSS counter 524, determination is made of the actual value for the SSNSS counter 524 that reflects the store capacity for speculative (S) stores and non-speculative (NS) stores being currently utilized.

Furthermore, at Step 675, it is determined whether an overflow condition (e.g., store capacity for speculative (S) stores and non-speculative (NS) stores has been exceeded) has occurred. If the overflow condition has not occurred, operation continues to Step 615, whereas the processor 510 returns to normal operation. If the overflow condition has occurred, operation continues to Step 680. At Step 680, the processor 510 responds with the appropriate error message or takes any other action in response to the overflow condition.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A processor comprising:
   a counter within said processor operable to count issued stores, wherein said counter is incremented responsive to an issued store, and wherein said counter is decremented responsive to a decrementing condition, and wherein said counter is incremented in response to a speculative store; and
   a monitoring component for determining whether a storing capacity for a store container has exceeded, wherein said counter is operable to manage said storing capacity of said store container, and wherein said storing capacity is for speculative stores.

2. The processor as described in claim 1, wherein said decrementing condition is a drain of an issued store.

3. The processor as described in claim 1, wherein said decrementing condition is a pre-allocated space for an issued store.

4. The processor as described in claim 1, wherein said determination by said monitoring component occurs when a value of said counter equals a predetermined value, and wherein said predetermined value is user selectable.

5. The processor as described in claim 1, wherein an issued store is a speculative store, and wherein said counter is cleared in response to a commit operation.

6. The processor as described in claim 1, wherein an issued store is a speculative store, and wherein said counter is cleared in response to a rollback operation.

7. The processor as described in claim 1, wherein an issued store is a speculative store, and wherein said decrementing condition is a pre-allocated space for an issued store.

8. The processor as described in claim 1, wherein said counter comprises:
   a first counter, wherein said first counter is incremented in response to a speculative store; and
   a second counter, wherein said second counter is incremented responsive to an issued store.

9. The processor as described in claim 8, wherein said determination by said monitoring component occurs when a value of said second counter equals a predetermined value.

10. The processor as described in claim 8, wherein said first counter is cleared in response to a commit operation.

11. The processor as described in claim 8, wherein a value of said first counter is subtracted from a value of said second counter in response to a rollback operation.

12. The processor as described in claim 8, wherein said decrementing condition is a drain of an issued store, and wherein said issued store is a non-speculative store.

13. A system comprising:
   a store container for storing issued stores;
   a queue, wherein said queue receives issued stores prior to said store container; and
   a processor comprising:
      a counter within said processor operable to count issued stores, wherein said counter is incremented responsive to an issued store, and wherein said counter is decremented responsive to a decrementing condition; and
      a monitoring component for determining whether a storing capacity for said store container has exceeded, wherein said counter is operable to manage said storing capacity of said store container.

14. The system as described in claim 13, wherein said decrementing condition is a drain of an issued store.

15. The system as described in claim 13, wherein said decrementing condition is a pre-allocated space for an issued store.

16. The system as described in claim 13, wherein said determination by said monitoring component occurs when a value of said counter equals a predetermined value, and wherein said predetermined value is user selectable.

17. The system as described in claim 13, wherein said store container comprises a data cache for supporting speculative modifications, and a speculative cache buffer, wherein said storing capacity is for issued stores that are speculative.

18. The system as described in claim 17, wherein said counter is incremented in response to a speculative store.

19. The system as described in claim 17, wherein said counter is cleared in response to a commit operation.

20. The system as described in claim 17, wherein said counter is cleared in response to a rollback operation.

21. The system as described in claim 17, wherein said decrementing condition is a pre-allocated space in said store container for an issued store that is a speculative store.

22. The system as described in claim 13, wherein said store container comprises a store buffer.

23. The system as described in claim 13, wherein said counter comprises:
   a first counter, wherein said first counter is incremented in response to a speculative store; and
   a second counter, wherein said second counter is incremented responsive to an issued store.

24. The system as described in claim 23, wherein said determination by said monitoring component occurs when a value of said second counter equals a predetermined value.

25. The system as described in claim 23, wherein said first counter is cleared in response to a commit operation.

26. The system as described in claim 23, wherein a value of said first counter is subtracted from a value of said second counter in response to a rollback operation.

27. The system as described in claim 23, wherein said store container comprises a store buffer, and wherein said decrementing condition is a drain of an issued store from said store buffer, and wherein said issued store is a non-speculative store.

28. A method of managing a storing capacity of a store container, said method comprising:
- receiving an issued store;
- incrementing a counter within a processor in response to said issued store, wherein said counter comprises a first counter and a second counter, wherein said first counter is incremented in response to a speculative store, and wherein said second counter is incremented responsive to an issued store; and
- decrementing said counter in response to a decrementing condition, wherein said counter is operable to manage said storing capacity of said store container.

29. The method of claim 28 further comprising:
- determining whether said storing capacity for said store container has exceeded.

30. The method of claim 29, wherein said determining occurs when a value of said counter equals a predetermined value.

31. The method of claim 28, wherein said decrementing condition is a drain of an issued store from said store container.

32. The method of claim 28, wherein said decrementing condition is a pre-allocated space in said store container for an issued store.

33. The method of claim 32, wherein said issued store is a speculative store.

34. The method of claim 28, wherein said incrementing is in response to an issued store, wherein said issued store is a speculative store.

35. The method of claim 28 further comprising:
- clearing said counter in response to a commit operation.

36. The method of claim 28 further comprising:
- clearing said counter in response to a rollback operation.

37. The method of claim 28 further comprising:
- clearing said first counter in response to a commit operation.

38. The method of claim 28 further comprising:
- subtracting a value of said first counter from a value of said second counter in response to a rollback operation.

39. The method of claim 28, wherein said decrementing condition is a drain of an issued store, and wherein said issued store is a non-speculative store.

40. The method of claim 28 further comprising:
- determining whether said storing capacity for said store container has exceeded, wherein said determining comprises:
  - determining a value of issued stores in said store container by draining a queue that receives issued stores prior to said store container; and
  - responsive to said determining said value, causing adjustment of a value of said first and second counter.

41. The method of claim 28 further comprising:
- determining whether said storing capacity for said store container has exceeded, wherein said determining comprises:
  - determining a value of issued stores in said store container by draining a queue to cause adjustment of a value of said counter.

42. The method of claim 41, wherein said issued stores are speculative stores.

* * * * *